United States Patent Office 2,996,537
Patented Aug. 15, 1961

2,996,537
β-TRINITROETHYL-γ-TRINITROBUTYRATE
Robert H. Saunders, West Chester, Pa., assignor, by mesne assignments, to the United States of America as represented by the Secretary of the Navy
No Drawing. Filed May 7, 1952, Ser. No. 286,601
1 Claim. (Cl. 260—478)

This invention relates to a new explosive compound, β-trinitroethyl-γ-trinitrobutyrate.

The new compound of the invention is a white crystalline solid which is stable at room temperature. It has properties making its use as an explosive highly feasible, having an oxygen balance within permissible limits and a sensitivity to impact between that of pentaerythrite tetranitrate and RDX.

The new compound may be prepared by the addition of nitroform across the double bond of trinitroethyl acrylate. The reaction is carried out by heating trinitroethyl acrylate with an excess of nitroform for about three hours at a temperature of about 58° centrigrade. The product formed is then recovered by recrystallization from a methanol-water solution.

Trinitroethyl acrylate was prepared by reacting acrylyl chloride with trinitroethanol as disclosed in my copending application Serial No. 286,603, filed May 7, 1952.

It is an object of the invention to provide a new explosive compound, β-trinitroethyl-γ-trinitrobutyrate.

The invention is illustrated by the following example, but is not limited thereto.

Example

A slight excess of nitroform was added to 3 grams of crude trinitroethyl acrylate and the mixture heated at 58° C. for about three hours. The resulting mixture was diluted with a water-methanol solution, and the product recovered by recrystallization accomplished by strong cooling in a Dry Ice bath.

The compound has the following formula:

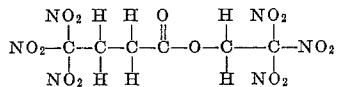

The percentage composition calculated for $C_6H_6N_6O_{14}$ is 18.6 percent carbon, 1.6 percent hydrogen, 21.8 percent nitrogen and the remainder oxygen. Analysis of the compound gave 18.8 percent carbon, 1.6 percent hydrogen and 21.6 percent nitrogen. The compound has an oxygen balance of −4.1. Its melting point is 86° C. It has an impact sensitivity of 30, as determined with the Bureau of Mines impact machine, this figure being the distance in centimeters a 2 kilogram weight was required to fall in order to produce 50% shots. Its ignition time at a temperature of 220° C. was found to be 18 seconds. This is the time required to produce ignition of approximately 25 milligrams of compound contained in a 0.30 caliber cap shell when immersed in a Wood's metal bath at 220° C. The compound gave a time of 25 minutes at 82.2° C. with the potassium iodide-starch stability test.

It is thus seen from the above that there has been provided a new compound having properties making its utility as an explosive highly feasible.

What is claimed is:
β-trinitroethyl-γ-trinitrobutyrate.

No references cited.